United States Patent [19]

Orikasa et al.

[11] Patent Number: 5,036,120
[45] Date of Patent: Jul. 30, 1991

[54] THERMOPLASTIC RESIN COMPOSITION AND METHOD FOR PREPARING THE SAME

[75] Inventors: Yuichi Orikasa, Yokohama; Suehiro Sakazume, Fujisawa, both of Japan

[73] Assignees: Nippon Petrochemicals Co., Ltd.; Nippon Oil and Fats Co., Ltd., Japan

[21] Appl. No.: 332,885

[22] Filed: Apr. 3, 1989

[30] Foreign Application Priority Data

Apr. 6, 1988 [JP] Japan .................................. 63-84397
Apr. 22, 1988 [JP] Japan .................................. 63-99651

[51] Int. Cl.$^5$ ...................... C08L 59/02; C08L 69/00
[52] U.S. Cl. ...................................... 523/436; 525/64; 525/67; 525/133; 525/148; 525/154; 525/155
[58] Field of Search ................... 525/64, 67, 148, 154, 525/155, 277, 133; 523/436

[56] References Cited

U.S. PATENT DOCUMENTS 4,639,488  1/1987  Schuette ................................. 525/64
4,877,841  10/1989  Moriya ................................. 525/277

FOREIGN PATENT DOCUMENTS 115373  8/1984  European Pat. Off. ............. 525/64
064654  4/1984  Japan ................................... 525/154

*Primary Examiner*—John C. Bleutge
*Assistant Examiner*—David Buttner
*Attorney, Agent, or Firm*—Ostrolenk, Faber, Gerb & Soffen

[57] ABSTRACT

A novel thermoplastic resin composition is here provided which contains

(I) 100 parts by weight of a polyoxymethylene resin alone or a mixture of the polyoxymethylene resin and a polycarbonate resin, with (II) 0.1 to 100 parts by weight of a multi-phase structure thermoplastic resin which is composed of 5 to 95% by weight of an epoxy group-containing olefin copolymer and 95 to 5% by weight of a vinyl polymer or copolymer obtained from at least one kind of vinyl monomer, either of both the components being in the state of a dispersion phase having a particle diameter of 0.001 to 10 μm.

Furthermore, a novel method for preparing the above-mentioned thermoplastic resin composition is also provided here.

20 Claims, 3 Drawing Sheets

THERMOPLASTIC RESIN COMPOSITION AND METHOD FOR PREPARING THE SAME

BACKGROUND OF THE INVENTION (1) Field of the Invention

The present invention relates to a thermoplastic resin composition having excellent impact resistance, electrical properties, heat resistance, moldability and dimensional stability, and a method for preparing the same. This composition of the present case can be widely utilized as materials for electrical and electronic parts, machine parts, automobile parts and the like.

(2) Description of the Prior Art

A polyoxymethylene resin is excellent in electrical properties, dimensional stability, moldability, sliding properties and mechanical strength, but it has the drawback that its impact properties are poor. On the other hand, a polycarbonate resin has excellent mechanical properties, heat resistance and moldability, but it is poor in chemical resistance and physical properties at low temperatures.

In order to remove this drawback, a method has been suggested in which a certain kind of elastomer is blended with the polyoxymethylene, and this method is relatively excellent in that impact resistance is improved.

However, as the amount of the elastomer is increased so as to improve the impact resistance, other characteristics of the polyoxymethylene resin deteriorate. In consequence, this method is not considered to be satisfactory.

If the drawbacks of the polyoxymethylene resin and the polycarbonate resin can be compensated mutually with the advantages thereof, thermoplastic resins having further improved characteristics will be obtained and new use applications will be developed. However, the polyoxymethylene resin and the polycarbonate resin are different in chemical structures, and affinity between these resins is insufficient. In consequence, the advantages of both the resins can scarcely been utilized.

SUMMARY OF THE INVENTION

The inventors of the present application have intensely researched to solve the above-mentioned problems, and as a result, they have found that when a specific multi-phase structure thermoplastic resin is used, impact resistance of the polyoxymethylene resin or the compatibility of a polyoxymethylene resin with a polycarbonate resin is improved, so that a composition can be provided which retains excellent electrical properties, dimensional stability and sliding properties of the polyoxymethylene which retains the above-mentioned characteristics of the polyoxymethylene resin and excellent impact resistance, moldability and heat resistance of the polycarbonate.

The first aspect of the present invention is directed to a thermoplastic resin composition containing (I) 100 parts by weight of a polyoxymethylene resin alone or a mixture of the polyoxymethylene resin and a polycarbonate resin, with (II) 0.1 to 100 parts by weight of a multi-phase structure thermoplastic resin which is composed of 5 to 95% by weight of an epoxy group-containing olefin copolymer and 95 to 5% by weight of a vinyl polymer or copolymer obtained from at least one kind of vinyl monomer, either of both the components being in the state of a dispersion phase having a particle diameter of 0.001 to 10 $\mu$m.

The second aspect of the present invention is directed to a method for preparing a thermoplastic resin composition which comprises the step of melting and mixing a polyoxymethylene resin alone or a mixture of the polyoxymethylene resin and a polycarbonate polymer (I) with 1 to 100% by weight of a graft polymerization precursor (A) which is obtained by first adding at least one kind of vinyl monomer, at least one kind of radical polymerizable or copolymerizable organic peroxide and a radical polymerization initiator to an aqueous suspension of an epoxy group-containing olefin copolymer, then heating the suspension under such conditions that the decomposition of the radical polymerization initiator does not occur substantially, in order to impregnate the epoxy group-containing olefin copolymer with the vinyl monomer, radical polymerizable or copolymerizable organic peroxide and radical polymerization initiator, and raising the temperature of this aqueous suspension, when the degree of the impregnation has reached 50% by weight or more of the original total weight of the vinyl monomer, peroxide and initiator, in order to copolymerize the vinyl monomer with the radical polymerizable or copolymerizable organic peroxide in the epoxy group-containing olefin copolymer, 0 to 99% by weight of an epoxy group-containing olefin copolymer (B), and 0 to 99% by weight of a vinyl polymer or copolymer (C) obtained by polymerizing at least one kind of vinyl monomer, or alternatively melting and mixing the components (A), (B) and (C) previously at a temperature in the range of 100° to 300° C. in order to form a multi-phase structure thermoplastic resin (II), and then melting and mixing the resin (II) with the resin (I).

BRIEF DESCRIPTION OF THE PHOTOGRAPHS

Photograph No. 1 is the electron microscope photograph of a multi-phase structure thermoplastic resin prepared in Preparation Example 1 in which spherical methyl methacrylate polymer particles having a diameter of 0.3 to 0.4 $\mu$m are dispersed in a base polymer matrix comprising ethyleneglycidyl methacrylate copolymer (E-GMA). This photograph is indicated with E-GMA-g-PMMA (multi-phase structure thermoplastic resin).

Photograph No. 2 is the electron microscope photograph of a random copolymer (Reference Example 1) of an ethyleneglycidyl methacrylate (GMA)-methyl methacrylate prepared by high-pressure radical polymerization. This photograph is indicated with E-GMA-MMA (random copolymer).

Photograph No. 3 is the electron microscope photograph of a blend composition (Reference Example 2) which is prepared by first blending E-GMA used in Preparation Example 1 with 30% by weight of polymethyl methacrylate (PMMA) and then mixing them under melting. This photograph is indicated with E-GMA/PMMA (blend polymer).

Photograph No. 4 is the electron microscope photograph of a short-chain graft polymer prepared by reacting E-GMA copolymer used in Preparation Example 1 with methyl methacrylate in a usual grafting manner. This photograph is indicated with E-GMA-g-MMA (short-chain graft polymer)

Photograph No. 5 is the electron microscope photograph (10,000 magnifications) of a multi-phase structure thermoplastic resin prepared in Preparation Example 2 in which spherical styrene polymer particles having a diameter of 0.3 to 0.4 μm are dispersed in a matrix comprising ethyleneglycidyl methacrylate copolymer.

This photograph is indicated with "E-GMA-g-PSt: multi-phase structure thermoplastic resin".

DETAILED DESCRIPTION OF THE INVENTION

Examples of a polyoxymethylene resin used in the present invention include an oxymethylene homopolymer substantially comprising an oxymethylene unit alone prepared from a raw material of a cyclic oligomer such as a formaldehyde monomer or its trioxane or tetraoxane; and an oxymethylene copolymer comprising an oxyalkylene unit having two or more carbons and an oxymethylene unit prepared from the above-mentioned raw material and ethylene oxide, propylene oxide, epichlorhydrin, 1,3-dioxolane, or a cyclic ether such as the formal of glycol or the formal of diglycol.

Examples of the polycarbonate resin used in the present invention include 4,4-dioxyallylalkane polycarbonates typified by a polycarbonate of 4,4-dihydroxydiphenyl-2,2-propane (generally called bisphenol A), but above all, 4,4-dihydroxydiphenyl-2,2-propane polycarbonate having a number average molecular weight of 15,000 to 80,000 is preferable. This polycarbonate may be prepared by an optional method. For example, 4,4-dihydroxydiphenyl-2,2-propane polycarbonate may be prepared by blowing phosgene in 4,4-dihydroxydiphenyl-2,2-propane as a dioxine compound in the presence of an aqueous caustic alkali solution and a solvent, or alternatively by carrying out ester interchange between 4,4-dihydroxydiphenyl-2,2-propane and diester carbonate in the presence of a catalyst.

The epoxy group-containing olefin copolymer (B) used in the present invention is a copolymer of an olefin and an unsaturated glycidyl group-containing monomer by a high-pressure radical polymerization as one example, or a terpolymer of an olefin, an unsaturated glycidyl group-containing monomer and another unsaturated monomer, or a multicomponent copolymer. The particularly preferable olefin of the copolymer is ethylene, and the preferable copolymer comprises 60 to 99.5% by weight of ethylene, 0.5 to 40% by weight of the glycidyl group-containing monomer and 0 to 39.5% by weight of another unsaturated monomer.

Examples of the unsaturated glycidyl group-containing monomer include glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, vinyl glycidyl ethers and glycidyl esters of α-chloroaryl, maleic acid, crotonic acid and fumaric acid, allyl glycidyl ether, glycidyl oxyethylvinyl ether, glycidyl ethers such as styrene p-glycidyl ether, and p-glycidyl styrene. The particularly preferable ones are glycidyl methacrylate and allyl glycidyl ether.

Other examples of the unsaturated monomers include olefins, vinyl esters, α,β-ethylenic unsaturated carboxylic acids and their derivatives. Typical examples of such unsaturated monomers include olefins such as propylene, butene-1, hexene-1, decene-1, octene-1 and styrene, vinyl esters such as vinyl acetate, vinyl propionate and vinyl benzoate, acrylic acid, methacrylic acid, esters such as methyl, ethyl, propyl, butyl, 2-ethylhexyl, cyclohexyl, dodecyl and octadecyl acrylates and methacrylates, maleic acid, maleic anhydride, itaconic acid, fumaric acid, maleic monoesters and diesters, vinyl ethers such as vinyl chloride, vinyl methyl ether and viny ethyl ether, and acrylic amide compounds. Particularly, acrylic and methacrylic esters are preferable.

Typical examples of the epoxy group-containing olefin copolymer include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Above all, ethylene-glycidyl methacrylate copolymer, ethylene-ethyl acrylate-glycidyl methacrylate copolymer and ethylene-vinyl acetate-glycidyl methacrylate copolymer are preferred.

These epoxy group-containing olefin copolymers can be used in a mixture thereof.

The epoxy group-containing olefin copolymer may be prepared by a high-pressure radical polymerization, i.e., by simultaneously or stepwise contacting and polymerizing a monomer mixture of 60 to 99.5% by weight of the above-mentioned ethylene, 0.5 to 40% by weight of one or more unsaturated glycidyl group-containing monomer, and 0 to 39.5% by weight of at least one other unsaturated monomer in the presence of 0.0001 to 1% by weight of a radical polymerization initiator based on the total weight of all the monomers at a polymerization pressure of 500 to 4,000 kg/cm$^2$, preferably 1,000 to 3,500 kg/cm$^2$, at a reaction temperature of 50° to 400° C., preferably 100° to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocarbons such as chloroform and carbon tetrachloride; saturated aliphatic alcohols having 1 to 20 or more carbon atoms such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Another example of the epoxy group-containing olefin copolymer regarding the present invention is a modified compound prepared by adding the above-mentioned unsaturated glycidyl group-containing monomer to a conventional olefin homopolymer or copolymer.

Examples of the above-mentioned olefin homopolymer include low-density, medium-density and high-density polyethylenes, polypropylene, polybutene-1 and poly-4-methylpentene-1, and examples of the above-mentioned copolymers include ethylene-propylene copolymer; ethylenebutene-1 copolymer; ethylene-hexene-1 copolymer; ethylene-4-methylpentene-1 copolymer; copolymers with other α-olefins mainly comprising ethylene such as ethylene-octene-1 copolymer; copolymers with other α-olefins mainly comprising propylene such as propylene-ethylene block copolymer; ethylene-vinyl acetate copolymer; ethylene-acrylic acid copolymer; ethylene-methacrylic acid copolymer; copolymers of ethylene and methyl, ethyl, propyl, isopropyl and butyl acrylate and methacrylate; ethylene-maleic acid copolymer; ethylene-propylene copolymer rubber; ethylene-propylenediene-copolymer rubber; liquid polybutadiene; ethylene-vinyl acetate-vinyl chloride copolymer; and mixtures thereof.

The epoxy-group containing olefin copolymer in the multi-phase structure thermoplastic resin (II) used in the present invention is the above-mentioned copolymer (B). Furthermore, typical examples of the vinyl polymer and copolymer in the resin (II) include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrene such as α-methylstyrene and α-ethylstyrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate; acrylamide and methacrylamide monomers; and monoesters and diesters of maleic anhydride and maleic acid. Above all, the vinyl polymer and copolymer containing 50% by weight or more of a vinyl aromatic monomer are particularly preferable.

The multi-phase structure thermoplastic resin (II) used in the present invention is an epoxy group-containing olefin copolymer or a vinyl polymer or copolymer matrix in which another vinyl polymer or copolymer or epoxy group-containing olefin copolymer is uniformly dispersed in a spherical form.

The polymer dispersed in the multi-phase structure thermoplastic resin has a particle diameter of 0.001 to 10 μm, preferably 0.01 to 5 μm. When the particle diameter of the dispersed polymer is less than 0.001 μm or is more than 10 μm, dispersion properties of the multi-phase structure thermoplastic resin in the polyoxymethylene resin alone or the mixture of this polyoxymethylene resin and the polycarbonate resin is bad, and for example, poor appearance and impact resistance are not improved.

The vinyl polymer or copolymer in the multi-phase thermoplastic resin (II) regarding the present invention has a number average polymerization degree of 5 to 10,000, preferably 10 to 5,000.

When the number average polymerization degree is less than 5, impact resistance of the thermoplastic resin composition regarding the present invention can be improved, but heat resistance deteriorates unpreferably. Inversely, when it is in excess of 10,000, melting viscosity is high, moldability deteriorates, and surface gloss falls off.

The multi-phase thermoplastic resin (II) used in the present invention comprises 5 to 95% by weight, preferably 20 to 90% by weight, of the epoxy group-containing olefin copolymer and 95 to 5% by weight, preferably 80 to 10% by weight, of the vinyl polymer or copolymer.

When the epoxy group-containing olefin copolymer is less than 5% by weight, the improvement of the impact resistance of the polyoxymethylene resin is poor, or its compatible effect with the mixture of the polyoxymethylene resin and the polycarbonate resin is insufficient, and when it is more than 95% by weight, heat resistance and dimensional stability of the blend regarding the present invention are impaired.

In the case that the component (I) of the thermoplastic resin composition of the present invention is the mixture of the polyoxymethylene resin and the polycarbonate resin, it is necessary that the amount of the polyoxymethylene resin is 50 to 99% by weight, preferably 60 to 95% by weight, if impact resistance and heat resistance which are low in the polyoxymethylene resin are improved while its features are maintained. Furthermore, it is required that the amount of the polycarbonate resin is 50 to 99% by weight, preferably 60 to 95% by weight, if chemical resistance and physical properties at low temperatures which are low in the polycarbonate resin are improved while its features are maintained.

As a grafting technique used to prepare the multi-phase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, water is suspended in 100 parts by weight of an epoxy group-containing olefin copolymer. Afterward, 5 to 400 parts by weight of at least one vinyl monomer is added to the suspension, and in the mixture, a solution is poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which a decomposition temperature to obtain a half-life period of 10 hours is from 40° to 90° C. The mixture is then heated under conditions that the decomposition of the radical polymerization initiator does not occur substantially, in order to impregnate the epoxy group-containing olefin copolymer with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the epoxy group-containing olefin copolymer, thereby obtaining a graft polymerization precursor (A). This graft polymerization precursor (A) is further kneaded under melting at a temperature of 100 to 300° C in order to prepare the desired multi-phase structure thermoplastic resin (II) of the present invention. At this time, the graft polymerization precursor may be kneaded under melting with the epoxy group-containing olefin copolymer (B) or vinyl polymer or copolymer (C) so as to obtain the multi-phase structure thermoplastic resin (II).

The graft polymerization precursor (A) is also the multi-phase structure thermoplastic resin. Therefore, this graft polymerization precursor may be directly mixed under melting with the polyoxymethylene resin alone or the mixture of this polyoxymethylene resin and the polycarbonate resin.

The above-mentioned radical polymerizable or copolymerizable organic peroxides are compounds represented by the general formulae (a) and (b):

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkylsubstituted phenyl group or a cycloalkyl group having 3 to 12 carbon atoms, m is 1 or 2, and n is 0, 1 or 2.

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylcumylperoxyacryloyloxyethyl carbonate, t-butylperoxymethacryloyloxyethyl carbonate, t-amylperoxymethacryloyloxyethyl carbonate, 1,1,3,3-tetramethylbutylperoxymethacryloyloxyethyl carbonate, cumylperoxymethacryloyloxyethyl carbonate, p-isopropylcumylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylcumylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylcumylperoxymethacryloyloxyethoxyethyl carbonate, t-butylperoxyacryloyloxyisopropyl carbonate, t-amylperoxyacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylcumylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate, p-isopropylcumylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-hexylmethallyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxymethallyl carbonate.

In the present invention, an inorganic filler (III) can be used in an amount of 1 to 150 parts by weight based on 100 parts of the components (I)+(II).

The inorganic filler may be used in granular, lamellar, scaly, needle, spherical, hollow and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; hollow fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

Furthermore, in the present invention, the thermoplastic resin composition can be brought into a flame resistant state by blending therewith a flame retardant (V) in an amount of 5 to 150 parts by weight based on 100 parts by weight of the thermoplastic resin composition (I)+(II).

Examples of the above-mentioned flame retardant include brominated and chlorinated paraffins such as tetrabromobisphenol (TBA), hexabromobenzene, decabromodiphenyl ether, tetrabromoethane (TBE), tetrabromobutane (TBB) and hexabromocyclodecane (HBCD), chlorine series flame retardants such as chlorinated paraffin, chlorinated polyphenyl, chlorinated polyethylene, chlorinated diphenyl, perchloropentacyclodecane and chlorinated naphthalene, usual halogen series flame retardants such as halogenated diphenyl sulfides, halogenated polystyrenes such as brominated polystyrene, brominated poly-α-methylstyrene and derivatives thereof, halogenated polycarbonates such as brominated polycarbonates, halogenated polyesters such as polyalkylene tetrabromoterephthalate and brominated terephthalic acid series polyesters, halogenated epoxy compounds such as halogenated bisphenol series epoxy resins, halogenated polyphenylene oxide compounds such as poly(dibromophenylene oxide), and high-molecular type halogen-containing polymers such as cyanuric acid ester compounds of halogenated bisphenols.

Of these flame retardants, oligomers and polymers of the aromatic halides are particularly preferred.

In addition, phosphorus series flame retardants include phosphates and halogenated phosphates such as tricresyl phosphate, tri($\beta$-chloroethyl) phosphate, tri(dibromopropyl) phosphate and 2,3-dibromopropyl-2,3-chloropropyl phosphate, phosphonic acid compounds and phosphonic acid derivatives.

Examples of other flame retardants include guanidine compounds such as guanidine nitride.

The above-mentioned organic flame retardants may be used alone or as a mixture of two or more thereof.

The organic flame retardant is used in an amount of 5 to 50 parts by weight, preferably 7 to 40 parts by weight based on 100 parts by weight of the thermoplastic resin composition (I)+(II). When the content of the flame retardant is less than 5 parts by weight, a flame-resistive effect is poor, and when it is more than 50 parts by weight, the flame-resistive effect is not improved any more and cost rises unpreferably.

These organic flame retardants, particularly halogen series flame retardants can exert a synergistic effect, when used together with a flame-resistive auxiliary.

Examples of the flame-resistive auxiliary include antiomony halides such as antimony trioxide, antimony pentaoxide, antimony trichloride and antimony pentaoxide, and antimony compounds such as antimony trisulfide, antimony pentasulfide, sodium antimonate, antimony tartrate and metallic antimony.

In addition, examples of the inorganic flame retardants used in the present invention include aluminum hydroxide, magnesium hydroxide, zirconium hydroxide, basic magnesium carbonate, dolonite, hydrotalcite, calcium hydroxide, barium hydroxide, hydrate of stannous hydroxide, hydrates of inorganic metallic compounds of borax and the like, zinc borate, zinc metaborate, barium metaborate, zinc carbonate, magnesium-calcium carbonate, calcium carbonate, barium carbonate, magnesium oxide, molybdenum oxide, zirconium oxide, stannous oxide and red phosphorus. These inorganic flame retardants may be used alone or as a mixture of two or more thereof. Of these flame retardants, hydrates of metallic compounds of aluminum hydroxide, magnesium hydroxide, zirconium hydroxide, basic magnesium carbonate, dolonite, hydrotalcite are particularly preferable. Above all, aluminum hydroxide and magnesium hydroxide are effective as the flame retardants and are economically advantageous.

The particle diameter of the inorganic flame retardant depends upon its kind, but in the cases of aluminum hydroxide and magnesium hydroxide, the average particle diameter is 20 $\mu$m or less, preferably 10 $\mu$m or less.

The inorganic flame retardant is used in an amount of 30 to 150 parts by weight, preferably 40 to 120 parts by weight based on 100 parts by weight of the thermoplastic resin composition (I)+(II). When the content of the inorganic flame retardant is less than 30 parts by weight, a flame-resistive effect is poor in its single use, and thus it is necessary to add the organic flame retardant thereto. Inversely, when it is more than 150 parts by weight, impact strength and mechanical strength deteriorate.

In the preparation of the thermoplastic composition of the present invention, melting and mixing of the components (I)+(II) or (III)+(IV) are carried out at a temperature of 200° to 350° C., preferably 200° to 320° C.

In melting and mixing, there may be used a usual kneader such as a mixing roll, a Banbury's mixer, a kneader mixer, a kneading extruder, a twin screw extruder and rolls. With regard to the order of melting and mixing the respective components, all of the components may be simultaneously melted and mixed, or alternatively the polyoxymethylene resin alone or the previously prepared mixture of this polyoxymethylene resin and the polycarbonate resin (I) may be mixed under melting with the multi-phase thermoplastic resin (II).

In the present invention, the following materials can be additionally used, in so far as they do not deviate from the gist of the present invention. Examples of such materials include a polyolefin resin, polyvinyl chloride resin, polyvinylidene chloride resin, fluorine-contained resin, aromatic polyester resin, polyamide resin, polyphenylene ether resin, polysulfone resin, polyarylene sulfide resin, natural rubber and synthetic rubber, antioxidant, ultraviolet inhibitor, lubricant, dispersant, foaming agent, crosslinking agent and colorant.

Now, the present invention will be described in detail in reference to examples.

Preparation Example 1 (Preparation of Multi-phase Structure Thermoplastic Resin II-1)

In a 5-liter stainless steel autoclave was placed 2,500 g of pure water, and 2.5 g of polyvinyl alcohol was further dissolved therein as a suspending agent. To the solution was further added 700 g of ethylene-glycidyl methacrylate copolymer as an epoxy group-containing olefin copolymer (content of glycidyl methacrylate=15% by weight; trade name Rexpearl J-3700; made by Nippon Petrochemicals Co., Ltd.), followed by stirring and suspending in a nitrogen atmosphere. Separately, in 300 g of methyl methacrylate as a vinyl monomer were dissolved 1.5 g of benzoylperoxide as a radical polymerization initiator (trade name Nyper-B; made by Nippon Oils & Fats Co., Ltd.) and 6 g of t-butylperoxymethacryloyloxyethyl carbonate as a radical polymerizable or copolymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the epoxy group-containing olefin copolymer was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80° to 85° C., and this temperature was then maintained for 7 hours to complete polymerization, followed by water washing and drying, thereby obtaining a graft polymerization precursor (A-1). A methyl methacrylate polymer was extracted from this graft polymerization precursor with ethyl acetate, and according to measurement by the use of GPC, the number average polymerization degree of the methyl methacrylate polymer was 700.

Next, this graft polymerization precursor was extruded at 220° C. by a plastomill monoaxial extruder (trade name Labo-Plasto-mill; made by Toyo Seiki Seisaku-sho Ltd.) to perform grafting reaction, whereby a multi-phase structure thermoplastic resin II-1 was obtained.

Figure 1:
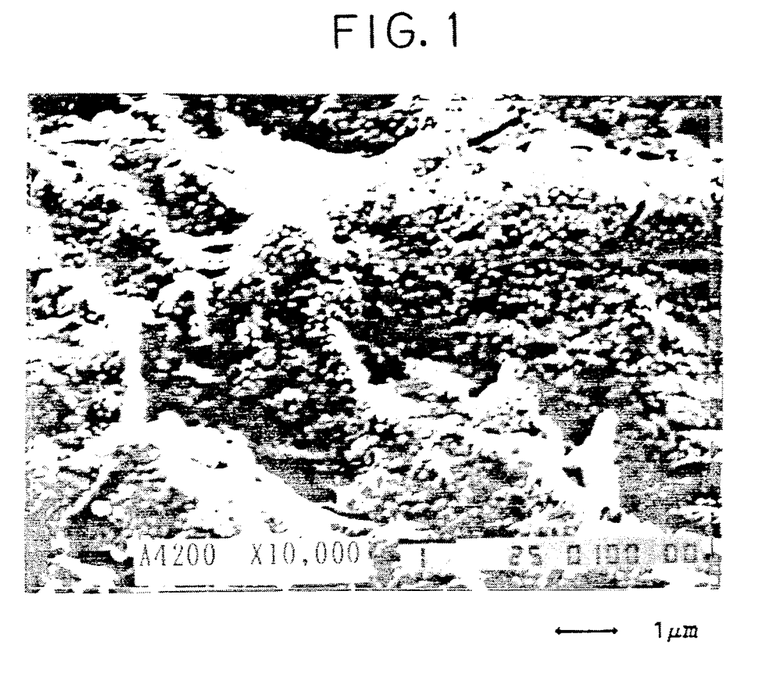

This multi-phase structure thermoplastic resin was then observed by a scanning electron microscope (trade name JEOL JSM T300; made by JEOL, Ltd.), and it was found that the resin was a multi-phase structure thermoplastic resin in which spherical resin particles each having a diameter of 0.3 to 0.4 μm were uniformly dispersed, as shown in Photograph No. 1. In this case, the grafting efficiency of the methyl methacrylate polymer was 68.8% by weight.

Reference Example 1 (Preparation of Random Copolymer)

Figure 2:
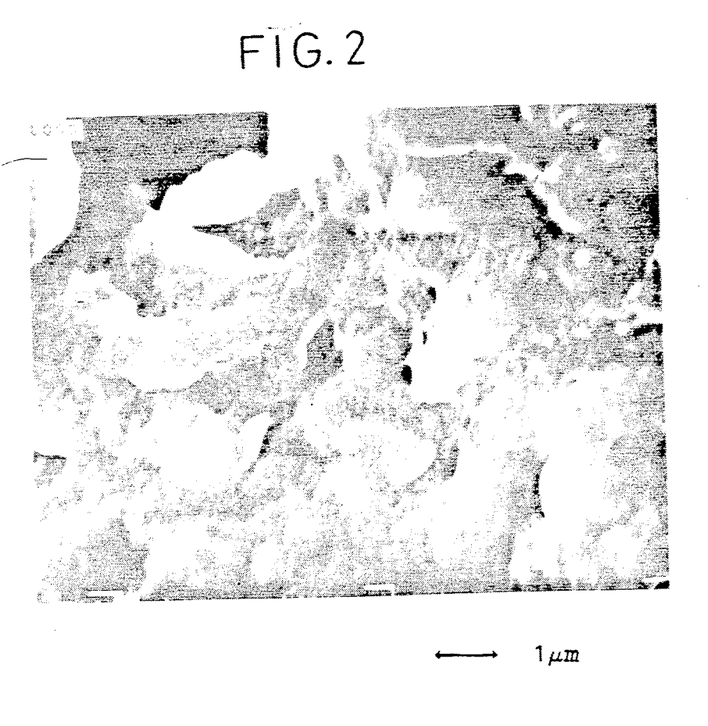

In a 3.8-liter reactor equipped with a stirrer were placed a mixture of 1,600 g of ethylene, 32 g of glycidyl methacrylate and 40 g of methyl methacrylte, and in the presence of 200 g of n-hexane as a chain transfer agent and 0.0012% by weight of a radical polymerization initiator (di-tert-butyl peroxide) based on the total weight of the mixture, reaction was then performed at a polymerization pressure of 1,600 kg/cm² at a reaction temperature of 170° C., thereby obtaining ethylene-glycidyl methacrylate-methyl methacrylate random terpolymer. Photograph No. 2 shows the observational result of the random copolymer by the use of an electron microscope. The results indicate that the random copolymer does not have such a multi-phase structure as in the present invention.

Reference Example 2 (Preparation of Blend)

Figure 3:
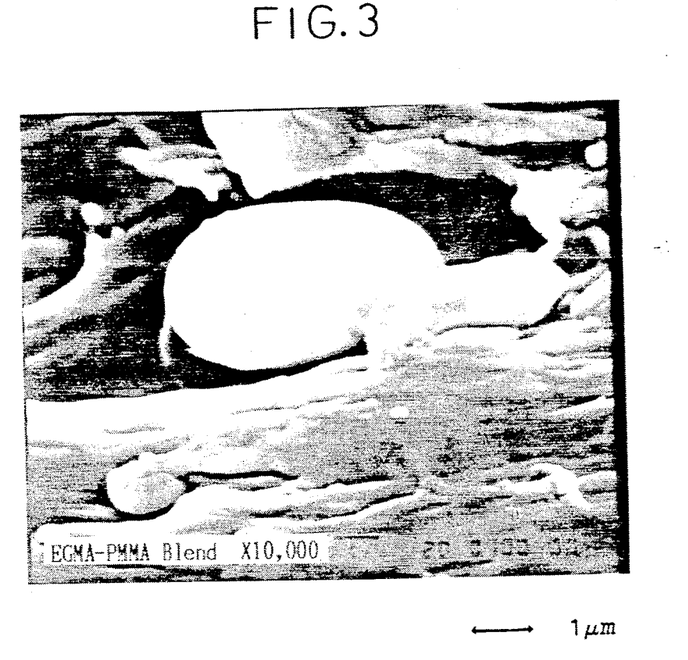

The epoxy group-containing ethylene copolymer used in Reference Example 1 was blended with 30% by weight of polymethyl methacrylate (trade name Acrypet MD; made by Mitsubishi Rayon Co., Ltd.), and they were mixed at 250° C. under melting. The blend was observed through an electron microscope, and the results are shown in Photograph No. 3. In the blend, the particle size of the dispersed polymethyl methacrylate is great, and therefore the structure of the polymer is noticeably different from the multi-phase structure of the present invention.

Reference Example 3

In a high-speed shear mixer, 950 g of ethylene-glycidyl methacrylate copolymer used in Preparation Example 1 was mixed, at ordinary temperature for 5 minutes, with a solution in which 0.5 g of dicumyl peroxide (trade name Percumyl D; made by Nippon Oils & Fats Co., Ltd.) was dissolved in 50 g of methyl methacrylate. The mixture was then extruded at 200° C. by an extruder, and grafting reaction was performed in a usual grafting manner in order to obtain a short-chain graft polymer.

Figure 4:
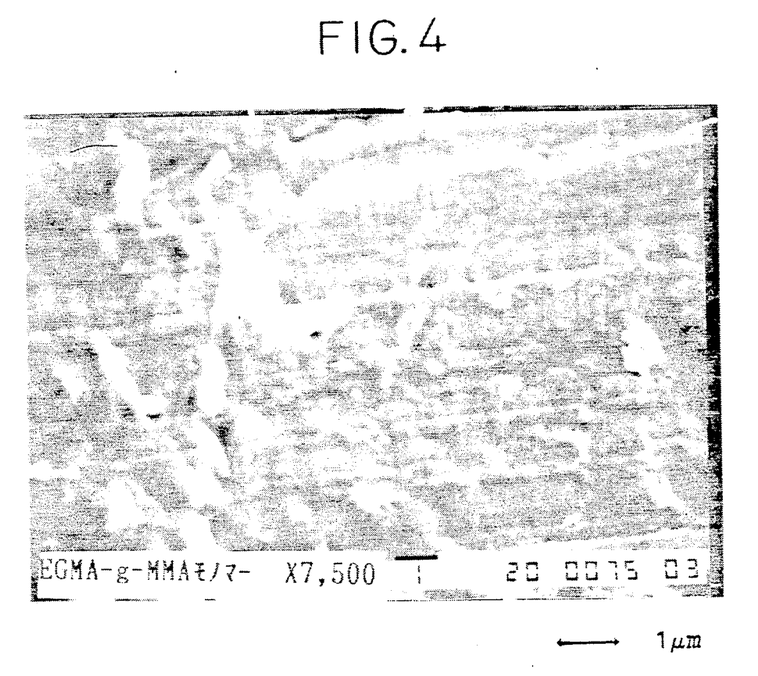

The structure of the thus obtained graft polymer can be observed from the electron microscope photograph of Photograph No. 4. The results in the photograph indicate that the above-mentioned short-chain graft polymer does not have such a multi-phase structure as seen in the polymer prepared in Preparation Example 1, but a single-phase structure.

Preparation Example 2 (Preparation of Multi-phase Structure Thermoplastic Resin II-2)

Figure 5:
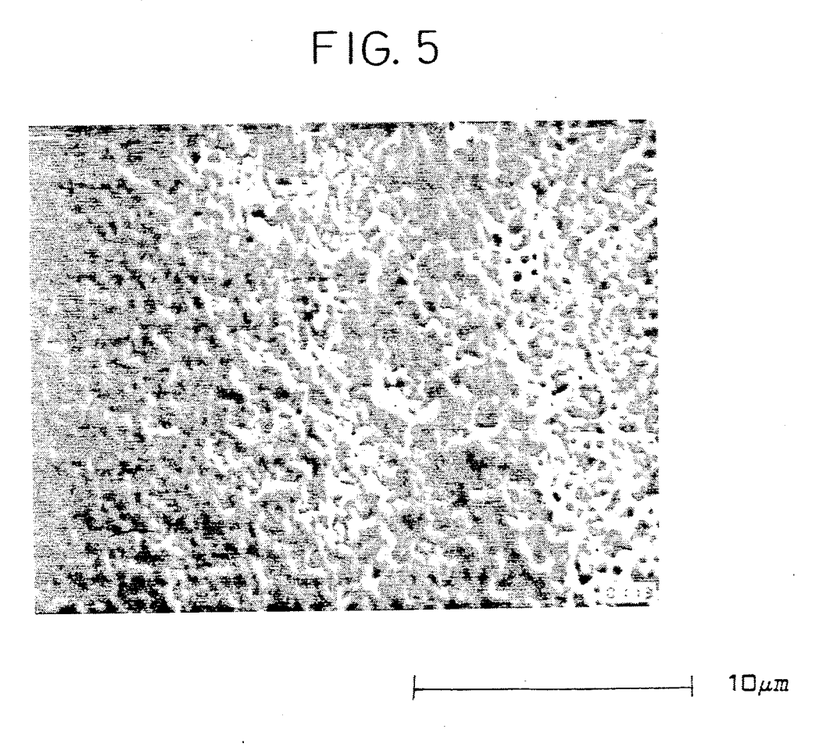

The same procedure as in Preparation Example 1 was repeated with the exception that 300 g of methyl methacrylate monomer as the vinyl monomer was replaced with 300 g of styrene and n-dodecylmercaptan as a molecular weight modifier was not used, thereby preparing a graft polymerization precursor II-2. At this time, the number average polymerization degree of the styrene polymer was 900, and the average particle diameter of the resin dispersed in the resin composition was from 0.3 to 0.4 μm, as shown in Photograph No. 5.

Preparation Example 3 (Preparation of Multi-phase Structure Thermoplastic Resin II-3)

The same procedure as in Preparation Example 2 was repeated with the exception that 300 g of styrene as the vinyl monomer was dissolved in 300 g of benzene as a solvent and 2.5 g of n-dodecylmercaptan as a molecular weight modifier was used, thereby preparing a multi-phase structure thermoplastic resin II-3. At this time, the number average polymerization degree of the styrene polymer was 4.1, and the state of the styrene polymer was liquid. When the multi-phase structure thermoplastic resin was observed by an electron microscope, it was presumed that the average diameter of dispersed particles would be 0.001 mm or less, but this could not be confirmed.

Examples 1 to 6

The multi-phase structure thermoplastic resins (II-1) and (II 2) obtained in Preparation Examples 1 and 2 were dry blended with polyoxymethylene resin (trade name Duracon M270-20; Polyplastics Co., Ltd.) in ratios shown in Table 1, and they were then mixed at 200° C. by means of a single screw extruder (trade name Labo-Plasto-mill; Toyo Seiki Seisakusho Ltd.). Afterward, specimens were prepared therefrom at 200° C. by the use of an injection molding machine, and they were then used in tests.

Size of the specimens and test procedures were as follows:

| Specimens for notched izod impact strength | 13 × 65 × 6 mm (JIS K7110) |
|---|---|
| Specimens for heat distortion temperature | 13 × 130 × 6 mm (JIS K7207) |
| Specimens for flexural modulus | 10 × 130 × 4 mm (JIS K6758) |

State of Delamination

The state of delamination was ranked as follows by visually observing the state of the broken surface of each molded article.

⊚: Delamination was not present at all.
◯: Delamination was slightly present.
X: Delamination was perceptibly present.

TABLE 1

| Example | 1 | 2 | 3 | 4 | 5 | 6 |
|---|---|---|---|---|---|---|
| Duracon (wt %) | 95 | 90 | 80 | 70 | 90 | 70 |
| Multi-Phase Structure Themoplastic Resin II-1 (wt %) | — | — | — | — | 10 | 30 |
| Multi-Phase Structure Themoplastic Resin II-2 (wt %) | 5 | 10 | 20 | 30 | — | — |
| Notched Izod Impact Strength (kg · cm/cm) | 40 | 55 | 59 | 60 | 51 | 58 |

Comparative Examples 1 to 4

The same procedure as in Example 1 was repeated with the exception that the multi-phase structure thermoplastic resins were replaced with the ethylene-glycidyl methacrylate copolymer used in Preparation Example 1. The results are set forth in Table 2.

TABLE 2

| Comp. Example | 1 | 2 | 3 | 4 |
|---|---|---|---|---|
| Duracon (wt %) | 100 | 90 | 80 | 70 |
| Ethylene-Glycidyl Methacrylate Copolymer (wt %) | — | 10 | 20 | 30 |
| Notched Izod Impact Strength (kg · cm/cm) | 6.2 | 21 | 27 | 34 |

Comparative Examples 5 to 9

The same procedure as in Example 1 was repeated with the exception that amounts of the multi-phase structure thermoplastic resins were changed. The results are set forth in Table 3.

TABLE 3

| Comp. Example | 5 | 6 | 7 | 8 | 9 |
|---|---|---|---|---|---|
| Duracon (wt %) | 99.5 | 35 | 25 | 35 | 25 |
| Multi-Phase Structure Thermoplastic Resin II-1 (wt %) | — | — | — | 65 | 75 |
| Multi-Phase Structure Thermoplastic Resin II-2 (wt %) | 0.5 | 65 | 75 | — | — |
| Notched Izod Impact Strength (kg · cm/cm) | 2.5 | * | * | * | * |

*Not broken.

In the molded article in which the multi-phase structure thermoplastic resin was in excess of 50% by weight, mechanical properties of the polyoxymethylene resin were not present. In addition, it was also apparent that when the amount of the multi-phase structure thermoplastic resin was less than 1% by weight, its effect was not perceived.

Examples 7 to 9 and Comparative Examples 10 to 12

The same procedure as in Example 1 was repeated with the exception that the polyoxymethylene resin was replaced with Derlin 500 (trade name; made by Du Pont), Tenack 5010 (trade name; made by Asahi Chemical Industry Co., Ltd.) and Copital F20 (trade name; made by Mitsubishi Gas Chemical Company, Inc.). The results are set forth in Table 4.

TABLE 4

| | Example | | | Comp. Example | | |
|---|---|---|---|---|---|---|
| | 7 | 8 | 9 | 10 | 11 | 12 |
| Derlin (wt %) | 90 | — | — | 100 | — | — |
| Tenack 5010 (wt %) | — | 90 | — | — | 100 | — |
| Copital F20 (wt %) | — | — | 90 | — | — | 100 |
| Multi-Phase Structure Thermoplastic Resin II-2 (wt %) | 10 | 10 | 10 | — | — | — |
| Notched Izod Impact Strength (kg · cm/cm) | 60 | 56 | 55 | 7.5 | 6.8 | 6.3 |

Comparative Example 13

The same procedure as in Example 2 was repeated with the exception that the multi-phase structure thermoplastic resin (II-2) was replaced with the multi-phase structure thermoplastic resin (II-3) prepared in Preparation Example 3.

As a result, the notched izod impact strength of the product was 22 kg.cm/cm.

Example 10

The same procedure as in Example 1 was repeated with the exception that 10 g of the graft polymerization precursor obtained in Preparation Example 2 and 10 g of unmodified epoxy group-containing ethylene copolymer were dry blended with 80 g of Duracon M270-02 (trade name; made by Polyplastics Co., Ltd.). As a result, the notched izod impact strength of the product was 43 kg.cm/cm.

Example 11

The same procedure as in Example 1 was repeated with the exception that no radical polymerizable or copolymerizable organic peroxide was used, in order to obtain a graft polymerization precursor. Each dispersed particle of the graft polymerization precursor had a particle diameter of 0.1 to 0.3 μm. A multi-phase structure thermoplastic resin was formed from this graft polymerization precursor, and afterward the same procedure as in Example 1 was repeated. As a result, the notched izod impact strength of the product was 31 kg.cm/cm.

Examples 12 to 17

A polycarbonate resin having a number average molecular weight of 62,000 was melted and mixed with Derlin 500 (trade name) used in Example 7 or Duracon M90 (trade name; made by Polyplastics Co., Ltd.) as a polyoxymethylene resin, the epoxy group-containing olefin copolymer used in Preparation Example 1 and the multi-phase structure thermoplastic resin (II-2) obtained in Preparation Example 2 in ratios shown in Table 5. Melting and mixing of these materials were carried out in a one-direction rotating twin screw extruder (made by Plastic Engineering Laboratory Co., Ltd.) having a screw diameter of 30 mm a temperature of which was set to 250° C. The mixture was then molded into granules, and they were dried at 150° C. for 3 hours. Afterward, specimens were prepared therefrom by injection molding.

Sizes of the specimens and procedures of tests were the same as in Example 1.

TABLE 5

| Example | 12 | 13 | 14 | 15 | 16 | 17 |
|---|---|---|---|---|---|---|
| Derlin 500 (pts. wt.) | 80 | — | 70 | — | 30 | — |
| Duracon M90 (pts. wt.) | — | 80 | — | 70 | — | 30 |
| Polycarbonate (pts. wt.) | 20 | 20 | 30 | 30 | 70 | 70 |

TABLE 5-continued

| Example | 12 | 13 | 14 | 15 | 16 | 17 |
|---|---|---|---|---|---|---|
| Multi-Phase Structure Themoplastic Resin (II-2) (pts. wt.) | 10 | — | 10 | 10 | 10 | — |
| Ethylene-Glycidyl Methacrylate Copolymer (pts.wt.) | — | 15 | — | 5 | — | 15 |
| Notched Izod Impact Strength (km · cm/cm) | 30 | 31 | 37 | 40 | 75 | 77 |
| Heat Distortion Temperature (°C.) | 130 | 133 | 120 | 116 | 105 | 103 |
| Flexural Modulus ($\times 10^3$ kg/cm$^2$) | 24.5 | 21.0 | 21.6 | 20.5 | 20.0 | 19.6 |
| State of Delamination | ⊚ | ⊚ | ⊚ | ⊚ | ⊚ | ⊚ |

Examples 18 to 23

In the above examples, the multi-phase structure thermoplastic resin was replaced with the graft precursor (IIA-2) obtained in the preparation example, and the results are set forth in Table 6. The effect of these examples was similar to that of the examples in which the multi-phase structure thermoplastic resin was used.

TABLE 6

| Example | 18 | 19 | 20 | 21 | 22 | 23 |
|---|---|---|---|---|---|---|
| Derlin 500 (pts. wt.) | 90 | — | 60 | — | 20 | — |
| Duracon M90 (pts. wt.) | — | 90 | — | 40 | — | 20 |
| Polycarbonate (pts. wt.) | 10 | 10 | 40 | 60 | 80 | 80 |
| Graft Polymerization Precursor (IIA-2) (pts. wt.) | 15 | 15 | 10 | 10 | 10 | 10 |
| Notched Izod Impact Strength (km · cm/cm) | 20 | 25 | 40 | 66 | 80 | 78 |
| Heat Distortion Temperature (°C.) | 125 | 120 | 115 | 106 | 98 | 95 |
| Flexural Modulus ($\times 10^3$ kg/cm$^2$) | 26.6 | 25.5 | 22.5 | 22.0 | 20.8 | 20.0 |
| State of Delamination | ⊚ | ⊚ | ⊚ | ⊚ | ⊚ | ⊚ |

Examples 24 to 29

In the above examples, a glass fiber having an average length of 5.0 mm and a diameter of 10 μm was additionally blended. The results are set forth in Table 7.

TABLE 7

| Example | 24 | 25 | 26 | 27 | 28 | 29 |
|---|---|---|---|---|---|---|
| Derlin 500 (pts. wt.) | 90 | — | 80 | — | 30 | — |
| Duracon M90 (pts. wt.) | — | 90 | — | 80 | — | 30 |
| Polycarbonate (pts. wt.) | 10 | 10 | 20 | 20 | 70 | 70 |

TABLE 7-continued

| Example | 24 | 25 | 26 | 27 | 28 | 29 |
|---|---|---|---|---|---|---|
| Multi-Phase Structure Themoplastic Resin (II-2) (pts. wt.) | 10 | — | 10 | — | 10 | — |
| Ethylene-Glycidyl Methacrylate Copolymer (pts, wt.) | — | 15 | — | 15 | — | 15 |
| Glass Fiber (pts. wt.) | 30 | 30 | 30 | 30 | 30 | 30 |
| Notched Izod Impact Strength (kg · cm/cm) | 13 | 16 | 12 | 13 | 23 | 27 |
| Heat Distortion Temperature (°C.) | 145 | 140 | 135 | 130 | 130 | 129 |
| Flexural Modulus ($\times 10^3$ kg/cm$^2$) | 60.5 | 59.0 | 53.6 | 53.0 | 52.0 | 51.0 |

Comparative Examples 14 to 19

In these comparative examples, ethylene-glycidyl methacrylate copolymer was used, in contrast to the above examples. The results are set forth in Table 8.

TABLE 8

| Comp. Example | 13 | 14 | 15 | 16 | 17 | 18 |
|---|---|---|---|---|---|---|
| Derlin 500 (pts. wt.) | 90 | — | 80 | — | 30 | — |
| Duracon M90 (pts. wt.) | — | 90 | — | 20 | — | 30 |
| Polycarbonate (pts. wt.) | 10 | 10 | 20 | 80 | 70 | 70 |
| Ethylene-Glycidyl Methacrylate Copolymer (pts. wt.) | 10 | 15 | 15 | 10 | 10 | 15 |
| Notched Izod Impact Strength (kg · cm/cm) | 7 | 9 | 10 | 15 | 12 | 16 |
| Heat Distortion Temperature (°C.) | 110 | 105 | 100 | 91 | 90 | 86 |
| State of Delamination | X | X | ○ | X | X | ○ |

The thermoplastic resin composition of the present invention has improved heat resistance, impact resistance, moldability, electrical properties and chemical resistance, and in addition, this composition can be easily manufactured only by mixing raw materials under melting.

What is claimed is:

1. A thermoplastic resin composition containing
   (I) 100 parts by weight of a polyoxymethylene resin alone or a mixture of said polyoxymethylene resin and a polycarbonate resin, with
   (II) 0.1 to 100 parts by weight of a graft copolymer which is composed of 5 to 95% by weight of an epoxy group-containing olefin copolymer and 95 to 5% by weight of a vinyl polymer or copolymer obtained from at least one kind of vinyl monomer, either of both the components being in the state of a dispersion phase having a particle diameter of 0.001 to 10 μm.

2. A thermoplastic resin composition according to claim 1 wherein said vinyl polymer or copolymer in said graft copolymer has an average polymerization degree of 5 to 10,000.

3. A thermoplastic resin composition according to claim 1 wherein said graft copolymer resin is a mixture and/or a grafted compound prepared by melting and mixing said mixture which comprises 1 to 100% by weight of a graft polymerization precursor (A) obtained by copolymerizing at least one vinyl monomer with at least one of radical polymerizable or copolymerizable organic peroxides represented by the following general formulae (a) and (b)

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2, in particles of an epoxy group-containing olefin copolymer, 0 to 99% by weight of an epoxy group-containing olefin copolymer (B), and 0 to 99% by weight of a vinyl polymer or copolymer (C) obtained by polymerizing or copolymerizing at least one vinyl monomer.

4. A thermoplastic resin composition according to claim 1 wherein said vinyl monomer is at least one vinyl monomer selected from the group consisting of vinyl aromatic monomers, acrylonitrile and methacrylonitrile monomers, and vinyl ester monomers.

5. A thermoplastic resin composition according to claim 1 wherein said vinyl polymer or copolymer comprises a vinyl monomer in which the content of a vinyl aromatic monomer is 50% by weight or more.

6. A thermoplastic resin composition according to claim 1 wherein said epoxy group-containing olefin copolymer is composed of 60 to 99.5% by weight of ethylene, 40 to 0.5% by weight of glycidyl acrylate or methacrylate and 0 to 39.5% by weight of another unsaturated monomer 7. A thermoplastic resin composition according to claim 1 wherein an inorganic filler (III) is additionally blended in an amount of 1 to 150 parts by weight based on 100 parts by weight of said thermoplastic resin composition (I)+(II).

8. A thermoplastic resin composition according to claim 1 wherein a flame retardant (IV) is additionally blended in an amount of 5 to 150 parts by weight based on 100 parts by weight of said thermoplastic resin composition (I)+(II).

9. A thermoplastic resin composition according to claim 1 in which said particle diameter is 0.01 to 5μm.

10. A thermoplastic resin composition according to claim 1 in which (I) is said polyoxymethylene resin alone.

11. A thermoplastic resin composition according to claim 1 in which (I) is said mixture of polyoxymethylene resin and a polycarbonate resin.

12. A thermoplastic resin composition according to claim 11 in which said polycarbonate resin is a bisphenol A polycarbonate having a number average molecular weight of 15,000 to 80,000.

13. A method for preparing a thermoplastic resin composition which comprises the step of melting and mixing a polyoxymethylene resin alone or a mixture of said polyoxymethylene resin and a polycarbonate polymer (I) with

1 to 100% by weight of a graft polymerization precursor (A) which is obtained by first adding at least one kind of vinyl monomer, at least one kind of radical polymerizable or copolymerizable organic peroxide and a radical polymerization initiator to an aqueous suspension of an epoxy group-containing olefin copolymer, then heating said suspension under such conditions that the decomposition of said radical polymerization initiator does not occur substantially, in order to impregnate said epoxy group-containing olefin copolymer with said vinyl monomer, radical polymerizable or copolymerizable organic peroxide and radical polymerization initiator, and raising the temperature of said aqueous suspension, when the degree of the impregnation has reached 50% by weight or more of the original total weight of said vinyl monomer, peroxide and initiator, in order to copolymerize said vinyl monomer with said radical polymerizable or copolymerizable organic peroxide in said epoxy group-containing olefin copolymer, 0 to 99% by weight of an epoxy group-containing olefin copolymer (B), and 0 to 99% by weight of a vinyl polymer or copolymer (C) obtained by polymerizing at least one kind of vinyl monomer, or alternatively melting and mixing the components (A), (B) and (C) previously at a temperature in the range of 100° to 300° C. in order to form a multiphase structure thermoplastic resin (II), and then melting and mixing said resin (II) with said resin (I).

14. A method for preparing a thermoplastic resin composition according to claim 13 wherein said radical polymerizable or copolymerizable organic peroxide is one or a mixture of two or more of peroxycarbonate compounds represented by the following general formulae (a) and (b)

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2.

15. A method for preparing a thermoplastic resin composition according to claim 13 wherein said vinyl polymer or copolymer in said multi-phase structure thermoplastic resin has an average polymerization degree of 5 to 10,000.

16. A method for preparing a thermoplastic resin composition according to claim 13 wherein said vinyl monomer is at least one vinyl monomer selected from the group consisting of vinyl aromatic monomers, acrylonitrile and methacrylonitrile monomers, and vinyl ester monomers.

17. A method for preparing a thermoplastic resin composition according to claim 13 wherein said epoxy group-containing olefin copolymer is composed of 60 to 99.5% by weight of ethylene, 40 to 0.5% by weight of glycidyl acrylate or methacrylate and 0 to 39.5% by weight of another unsaturated monomer.

18. A method for preparing a thermoplastic resin composition according to claim 13 wherein said vinyl polymer or copolymer comprises a vinyl monomer in which the content of a vinyl aromatic monomer is 50% by weight or more.

19. A method for preparing a thermoplastic resin composition according to claim 13 wherein an inorganic filler (III) is additionally blended in an amount of 1 to 150 parts by weight based on 100 parts by weight of said thermoplastic resin composition (I)+(II).

20. A method for preparing a thermoplastic resin composition according to claim 13 whererin a flame retardant (IV) is additionally blended in an amount of 5 to 150 parts by weight based on 100 parts by weight of said thermoplastic resin composition (I)+(II).

* * * * *